US011089207B2

(12) United States Patent
Wang

(10) Patent No.: US 11,089,207 B2
(45) Date of Patent: Aug. 10, 2021

(54) IMAGING PROCESSING METHOD AND APPARATUS FOR CAMERA MODULE IN NIGHT SCENE, ELECTRONIC DEVICE AND STORAGE MEDIUM

(71) Applicant: Guangdong Oppo Mobile Telecommunications Corp., Ltd., Guangdong (CN)

(72) Inventor: Yulu Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/546,907

(22) Filed: Aug. 21, 2019

(65) Prior Publication Data

US 2020/0068121 A1 Feb. 27, 2020

(30) Foreign Application Priority Data

Aug. 22, 2018 (CN) .......................... 201810963331.3

(51) Int. Cl.
*H04N 5/232* (2006.01)
*H04N 5/235* (2006.01)
*G06T 7/00* (2017.01)

(52) U.S. Cl.
CPC ....... *H04N 5/23222* (2013.01); *G06T 7/0002* (2013.01); *H04N 5/2353* (2013.01); *H04N 5/23258* (2013.01); *G06T 2207/30201* (2013.01)

(58) Field of Classification Search
CPC ............. H04N 5/23222; H04N 5/2353; H04N 5/23258; H04N 5/23219; H04N 5/23245;
(Continued)

(56) References Cited

U.S. PATENT DOCUMENTS 7,944,474 B2 * 5/2011 Ono ..................... H04N 5/2327
348/208.12
2008/0007634 A1 * 1/2008 Nonaka ................ H04N 5/2355
348/234
(Continued)

FOREIGN PATENT DOCUMENTS

CN 101345824 A 1/2009
CN 103051841 A 4/2013
(Continued)

OTHER PUBLICATIONS

OA with English translation for CN application 201810963331.3.
(Continued)

*Primary Examiner* — Hung H Lam
(74) *Attorney, Agent, or Firm* — Young Basile Hanlon & MacFarlane, P.C.

(57) ABSTRACT

The present disclosure provides an imaging processing method and apparatus for a camera module in a night scene, an electronic device and a storage medium. The method includes: detecting a current shake level of the camera module in a night scene shooting mode; determining, according to the current shake level of the camera module, a number of images to be collected and a reference sensitivity corresponding to each of the images to be collected; determining an exposure duration corresponding to each of the images to be collected according to an illuminance of a current shooting scene and the reference sensitivity corresponding to each of the image to be collected; collecting images in sequence according to the reference sensitivity and the exposure duration corresponding to each of the images to be collected; and performing a synthesis processing on the collected images to generate a target image.

20 Claims, 4 Drawing Sheets

(58) Field of Classification Search
CPC ............. H04N 5/23277; H04N 5/2355; H04N 5/2356; H04N 5/35581; H04N 5/243; H04N 5/2351; G06T 7/0002; G06T 2207/30201; G06T 2207/20221; G06T 2207/10144; G06T 5/50; G06K 9/00228
See application file for complete search history.

(56) References Cited

U.S. PATENT DOCUMENTS

| | | | |
|---|---|---|---|
| 2009/0160968 A1 | 6/2009 | Prentice et al. | |
| 2010/0194925 A1* | 8/2010 | Kubota | H04N 5/232945 348/234 |
| 2011/0149095 A1* | 6/2011 | Kikuchi | H04N 5/23248 348/208.4 |
| 2013/0063618 A1 | 3/2013 | Miyazaki | |
| 2013/0314563 A1 | 11/2013 | Abe et al. | |
| 2013/0330001 A1* | 12/2013 | Wong | G06K 9/6289 382/168 |
| 2015/0271383 A1* | 9/2015 | Bienvenu | H04N 5/2356 382/167 |
| 2016/0037067 A1 | 2/2016 | Lee et al. | |
| 2019/0129282 A1* | 5/2019 | Hasegawa | H04N 5/232939 |

FOREIGN PATENT DOCUMENTS

| | | |
|---|---|---|
| CN | 103369228 A | 10/2013 |
| CN | 103561210 A | 2/2014 |
| CN | 103841324 A | 6/2014 |
| CN | 106375676 A | 2/2017 |
| CN | 107509044 A | 12/2017 |
| CN | 107613190 A | 1/2018 |
| CN | 107635101 A | 1/2018 |
| CN | 107820022 A | 3/2018 |
| CN | 108322669 A | 7/2018 |
| CN | 109005366 A | 12/2018 |
| EP | 2521091 A1 | 11/2012 |
| WO | 2008068865 A1 | 6/2008 |

OTHER PUBLICATIONS

OA for EP application 19193125.2 dated Jan. 21, 2020.
English translation of Notification of Registration 201810963331.3 dated Mar. 5, 2020.
Search report for EP application 19193125.2 dated Jul. 10, 2020.
ISR for PCT application PCT/CN2019/088017 dated Aug. 13, 2019.
India Examination Report for IN Application 201914033853 dated May 4, 2021.

* cited by examiner

IMAGING PROCESSING METHOD AND APPARATUS FOR CAMERA MODULE IN NIGHT SCENE, ELECTRONIC DEVICE AND STORAGE MEDIUM

CROSS-REFERENCE TO RELATED APPLICATION(S)

This application claims priority to Chinese Patent Application No. 201810963331.3, filed on Aug. 22, 2018, the entire content of which is incorporated herein by reference.

TECHNICAL FIELD

The present disclosure relates to a field of imaging technology, and in particular, to an imaging processing method and apparatus for a camera module in a night scene, an electronic device, and a storage medium.

BACKGROUND

With the development of technology, smart mobile terminals (such as smart phones, tablets, etc.) have become increasingly popular. Most smartphones and tablets have built-in cameras, and with the enhancement of the processing power of mobile terminals and the development of camera technology, the built-in cameras gain powerful and advanced performance, and the captured images have high quality and resolution. Nowadays, the operation of the mobile terminal is simple and portable, and it has become a normal state for people to use mobile phones such as smart phones and tablet computers to take pictures in daily life.

While smart mobile terminals bring convenience to people's daily photography, requirements of the quality of captured images for the users have continuously increased. However, due to limitations of professions, users do not know how to set appropriate shooting parameters according to the shooting scene, causing difficulties to take images with same effect of those captured by a professional camera, especially in some harsh scenes, such as rainy weather, backlight scenes, night scenes and so on. Therefore, intelligent scene recognition technology that does not need to set the shooting parameters manually has emerged.

In a night shooting scene, due to the poor illuminating conditions, it is usually necessary to extend the exposure time to ensure the exposure amount, which results in the image of the night scene shooting not only with low brightness, but also with an introduction of ghosts or artifacts due to the hand shake if the exposure time is too long when performing a handheld shooting. Among the related art, the technology suitable for night scene shooting includes the HDR+ technology in the High-Dynamic Range (HDR) technology.

In the HDR+ technology, multiple underexposure images with the same exposure time are took, and then these images are superimposed to a target brightness in the RAW domain, in which a RAW image is the RAW data (original data) from a Complementary Metal Oxide Semiconductor (CMOS) or Charge-coupled Device (CCD) image sensor that converts the captured light source signal into a digital signal. Due to the short and same exposure time, the HDR+ technology has a good effect on stabilization and ghosting, but the improvement of the dynamic range is limited, and the improvement of the overall picture brightness is not good enough.

SUMMARY

An imaging processing method and apparatus for a camera module in a night scene, an electronic device, and a storage medium are proposed in the present disclosure.

An imaging processing method for a camera module in a night scene according to an aspect of embodiments of the present disclosure may include: detecting a current shake level of the camera module in a night scene shooting mode; determining, according to the current shake level of the camera module, a number of images to be collected and a reference sensitivity corresponding to each of the images to be collected; determining an exposure duration corresponding to each of the images to be collected according to an illuminance of a current shooting scene and the reference sensitivity corresponding to each of the image to be collected; collecting images in sequence according to the reference sensitivity and the exposure duration corresponding to each of the images to be collected; and performing a synthesis processing on the collected images to generate a target image.

An electronic device according to another aspect of embodiments of the present disclosure includes: a camera module, a memory, a processor, and a computer program stored on the memory and operable on the processor, in which, when the processor executes the computer program, the processor is configured to: detect a current shake level of the camera module in a night scene shooting mode; determine, according to the current shake level of the camera module, a number of images to be collected and a reference sensitivity corresponding to each of the images to be collected; determine an exposure duration corresponding to each of the images to be collected according to an illuminance of a current shooting scene and the reference sensitivity corresponding to each of the image to be collected; collect images in sequence according to the reference sensitivity and the exposure duration corresponding to each of the images to be collected; and perform a synthesis processing on the collected images to generate a target image.

A computer readable storage medium according to yet another aspect of embodiments of the present disclosure has stored thereon a computer program, in which the computer program is executed by a processor to implement the imaging processing method for a camera module in a night scene as described above.

The aspects and advantages of the present invention will be set forth in part in the following description or known from practices of the present disclosure.

BRIEF DESCRIPTION OF DRAWINGS

The above and/or additional aspects and advantages of the present disclosure will become apparent and readily understood from the descriptions with reference to the figures.

DETAILED DESCRIPTION

Figure 1:
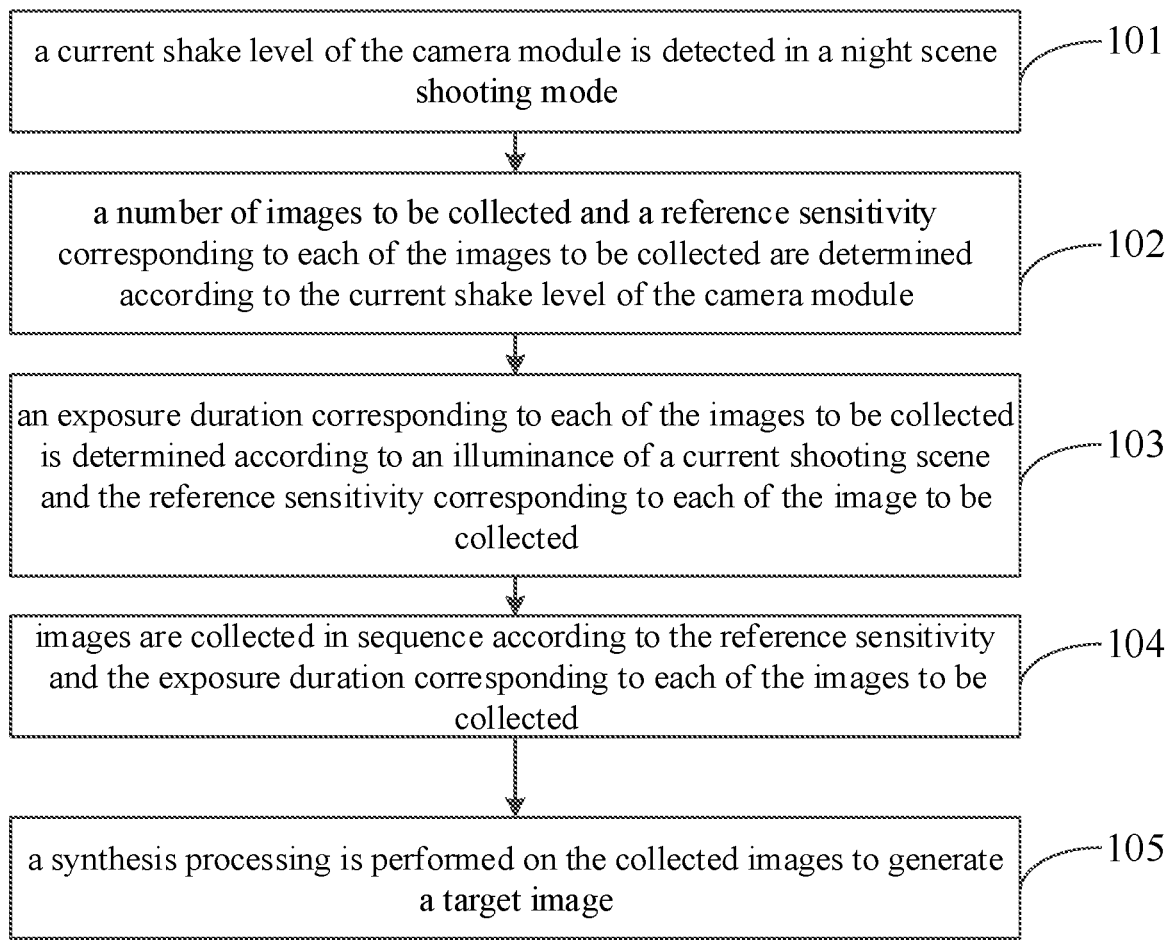
FIG. 1 is a schematic flowchart diagram of an imaging processing method for a camera module in a night scene according to an embodiment of the present disclosure.

The embodiments of the present disclosure are described in detail below, and the examples of the embodiments are illustrated in the accompanying drawings, in which the same or similar reference numerals indicate the same or similar elements. The embodiments described below with reference to the accompanying drawings are intended to be illustrative, and are not to be construed as limitations.

The embodiments of the present disclosure propose an imaging processing method for a camera module in a night scene to solve problems such as limited dynamic range and low overall brightness of images captured in a night scene and thus affecting the user experience in the related art.

With the imaging processing method for a camera module in a night scene provided by the embodiments of the present disclosure, a current shake level of the camera module is detected in a night scene shooting mode, a number of images to be collected and a reference sensitivity corresponding to each of the images to be collected are determined according to the current shake level of the camera module, and an exposure duration corresponding to each of the images to be collected is determined according to an illuminance of a current shooting scene and the reference sensitivity corresponding to each of the image to be collected. Images are collected in sequence according to the reference sensitivity and the exposure duration corresponding to each of the images to be collected, and a synthesis processing is performed on the collected images to generate a target image. Therefore, by determining the number of images to be collected and the reference sensitivity according to the current shake level of the camera module, and by determining the exposure duration corresponding to each of the images to be collected according to the illuminance of the current shooting scene to synthesize the collected images with different exposure durations, the dynamic range and overall brightness of the captured image in the night scene are improved, and the noise in the image are effectively suppressed, allowing that the ghosting caused by hand-held shaking is suppressed, the quality of captured image in the night scene is improved, and the user experience may be improved as well.

The imaging processing method and apparatus for a camera module in a night scene, the electronic device, the computer readable storage medium and the computer program provided by the embodiments of the present disclosure will be described in detail below with reference to the accompanying drawings.

FIG. 1 is a schematic flowchart diagram of an imaging processing method for a camera module in a night scene according to an embodiment of the present disclosure.

As illustrated in FIG. 1, the imaging processing method for a camera module in a night scene includes followings.

At block 101, a current shake level of the camera module is detected in a night scene shooting mode.

In the embodiment of the present disclosure, the current shake level of the mobile phone, that is, the current shake level of the camera module, may be determined by acquiring current Gyro-sensor information of the electronic device.

The Gyro-sensor is also called an angular velocity sensor, which may measure a rotating angular velocity when a deflection or a tilt occurs. In the electronic device, the Gyro-sensor may measure the rotation and deflection well, such that the actual motion of the user may be accurately analyzed. The Gyro-sensor information (gyro information) of the electronic device may include motion information of a mobile phone in three dimensions in a three-dimension space, and the three dimensions of the three-dimension space may represent an X-axis, a Y-axis, and a Z-axis, in which the X axis, the Y axis, and the Z axis are vertical to each other.

It should be noted that, in a possible implementation of the embodiments of the present disclosure, the current shake level of the camera module may be determined according to the current gyro information of the electronic device. The greater the absolute value of a gyro motion of the electronic device in the three directions, the greater the shake level of the camera module. Specifically, the absolute value thresholds of the gyro motions in three directions may be preset, and the current shake level of the camera module is determined according to the relationship between a sum of the obtained absolute values of the gyro motions in the three directions and the preset threshold.

For example, assuming that the preset thresholds are a first threshold A, a second threshold B, and a third threshold C, in which A<B<C, and the sum of the acquired absolute values of the currently gyro motions in the three directions is S. If S<A, it is determined that the current shake level of the camera module is "no shake"; if A≤S<B, it is determined that the current shake level of the camera module is "slight shake"; if B≤S<C, it is determined that the current shake level of the camera module is "small shake"; if S≥C, it is determined that the current shake level of the camera module is "strong shake".

It should be noted that the above examples are merely exemplary and are not to be considered as limitations for the present disclosure. In actual use, the number of thresholds and the specific value of each threshold may be preset according to actual needs, and the mapping relationship between the gyro information and the shake level of the camera module may be preset according to the relationship between the gyro information and each threshold.

At block 102, a number of images to be collected and a reference sensitivity corresponding to each of the images to be collected are determined according to the current shake level of the camera module.

The sensitivity, also known as the ISO value, is an indicator of a sensibility of a photographic plate (a negative film) to light. For those photographic plates with low sensitivity, a long exposure time is needed to reach a same imaging effect as the higher sensitivity plates. The sensitivity of a digital camera is an indicator similar to a film sensitivity. The ISO of the digital camera may be adjusted by adjusting the sensibility of the photosensitive elements or synthesizing photosensitive points, that is, by increasing the light sensitivity of the photosensitive element or combining several adjacent photosensitive points to achieve the purpose of improving ISO. It should be noted that, in the case of digital photography or negative film photography, in order to reduce the exposure time, the use of relatively high sensitivity usually introduces more noise, resulting in a decrease in image quality.

In the embodiment of the present disclosure, the reference sensitivity refers to the minimum sensitivity which is adaptive to the current shake level of the camera module and determined according to the current shake level.

It should be noted that, in the embodiment of the present disclosure, by collecting low-sensitivity images and synthesizing the acquired images to generate a target image, the dynamic range and the overall brightness of the night scene captured image may be improved, and by controlling the value of the sensitivity, noise in the image may be effectively suppressed and the quality of the night scene captured image may be improved.

It may be understood that the number of images captured and the sensitivity of the captured image will affect the overall shooting time, and a long shooting time may cause an increased shake of the camera module when performing a handheld shooting, thereby affecting the image quality. Therefore, according to the current shake level of the camera module, the number of images to be collected and the reference sensitivity corresponding to the images to be collected in each frame may be determined, such that the shooting duration is controlled within an appropriate range.

Specifically, if the current shake level of the camera module is low, more images may be collected, and the reference sensitivity corresponding to each of the images to be collected may be appropriately compressed to a small value to effectively suppress the noise of each image and improve the quality of the captured image; if the current shake level of the camera module is high, few images may be collected, and the reference sensitivity corresponding to each of the images to be collected may be appropriately increased to a large value so as to shorten the length of shooting time.

For example, if it is determined that the current shake level of the camera module is "no shake", it may be determined that the current shooting is performed in a mode with a tripod. In this case, more images may be collected, and the reference sensitivity is determined to be a smaller value, so as to obtain higher quality images, such as determining the number of images to be collected being 17, and the reference sensitivity being 100. If it is determined that the current shake level of the camera module is "slight shake", it may be determined that the current shooting may be in a handheld shooting mode, at this time, less images may be collected, and the reference sensitivity may be determined to a larger value to reduce the shooting time, such as determining the number of images to be collected being 7, and the reference sensitivity being 200. If the current shake level of the camera module is determined as "small shake", then it may be determined that the current shooting may be in a handheld shooting mode, at this time, the number of images to be collected may be further reduced and the reference sensitivity may be further increased so as to reduce the shooting duration, such as determining the number of images to be collected being 5 frames, and the reference sensitivity being 220. If it is determined that the current shake level of the camera module is "strong shake", it may be determined that the current shake level is relative high, and at this time the number of images to be collected may be further reduced, or collecting multiple images may not be performed, and the reference sensitivity may be further increased to reduce the shooting duration, such as determining the images to be collected being 3, and the reference sensitivity being 250.

It should be noted that the above examples are merely exemplary and are not to be considered as limitations for the present disclosure. In actual use, when the shake level of the camera module changes, both or either the number of images to be collected and the reference sensitivity may be changed, so as to obtain an optimal solution. The mapping relationship between the shake level of the camera module and the number of images to be collected and the reference sensitivity corresponding to each of the images to be collected may be preset according to actual needs.

At block 103, an exposure duration corresponding to each of the images to be collected is determined according to an illuminance of a current shooting scene and the reference sensitivity corresponding to each of the image to be collected.

The exposure duration refers to a time period during the light passes through the lens.

In the embodiment of the present disclosure, the illuminance of the current shooting scene may be obtained by using a photometry module in the camera module, and the exposure amount corresponding to the current illuminance is determined by using an Auto Exposure Control (AEC) algorithm, and then the exposure duration corresponding to each image to be collected may be determined according to the determined exposure amount and the reference sensitivity corresponding to the each image to be collected.

It should be noted that the exposure amount is related to the aperture, the exposure duration, and the sensitivity, in which the aperture is the optical aperture which determines the amount of light passing through per unit time. When the reference sensitivities corresponding to the respective images to be collected are the same, and the aperture sizes are the same, the greater exposure amount corresponding to the illuminance of the current shooting scene, the longer exposure duration corresponding to each image to be collected.

Further, the exposure durations corresponding to the images to be collected are different, in order to obtain images of different dynamic ranges, such that the synthesized image has a higher dynamic range and thus improving the overall brightness and quality of the image. In a possible implementation of the embodiments of the present disclosure, the foregoing act in block 103 may include: determining a reference exposure amount according to the illuminance of the current shooting scene; determining a reference exposure duration according to the reference exposure amount and the reference sensitivity corresponding to each of the images to be collected; and determining, according to the reference exposure duration and a preset exposure compensation mode, the exposure duration corresponding to each of the images to be collected.

The reference exposure amount refers to a normal exposure amount corresponding to the illuminance of the current shooting scene determined according to the illuminance of the current shooting scene. When the size of the aperture is determined, the reference exposure duration may be determined based on the reference sensitivity and the reference exposure amount.

In embodiments of the present disclosure, different exposure compensation strategies may be adopted for each frame to be acquired by using the preset exposure compensation mode, such that the images to be collected correspond to different exposure amounts so as to obtain images with different dynamic ranges.

It should be noted that the preset exposure compensation mode refers to a combination of Exposure Values (EV) preset for the respective images to be collected. In the initial definition of the exposure value, the exposure value does not refer to an accurate value, but refers to "a combination of all camera apertures and exposure durations that is able to give the same exposure amount". The sensitivity, the aperture, and the exposure duration determine the exposure amount for the camera. Different combinations of parameters may produce equal exposures, i.e., the EV values for these different combinations are the same. For example, in a case of the same sensitivity, the exposure amount acquired with a combination of the exposure duration of $1/125$ and the aperture of f11 is same to that acquired with a combination of the exposure time of $1/250$ sec and the f8 shutter, that is, the EV values are the same. When the EV value is 0, it refers to the exposure amount obtained with the sensitivity of 100, the aperture coefficient of f1, and the exposure duration of 1 second. If the exposure amount is increased by one level, the exposure time is doubled, or the sensitivity is doubled, and the EV value is increased by 1. In other words, the exposure amount corresponding to 1 EV is double the exposure amount corresponding to 0 EV. The correspondence relationship between the EV values and the respective exposure durations, the apertures, and the sensitivities is illustrated in Table 1.

TABLE 1 correspondence relationship between the exposure durations and the EV values when the aperture parameter is 1 and the sensitivity is 100

| exposure duration/s | | | | | | | | | | |
|---|---|---|---|---|---|---|---|---|---|---|
| | 1 | 1/2 | 1/4 | 1/8 | 1/15 | 1/30 | 1/60 | 1/125 | 1/250 | 1/500 | 1/1000 |
| EV | 0 | 1 | 2 | 3 | 4 | 5 | 6 | 7 | 8 | 9 | 10 | correspondence relationship between the aperture parameters and the EV values when the exposure duration is 1 second and the sensitivity is 100

| aperture parameter | | | | | | | | | | |
|---|---|---|---|---|---|---|---|---|---|---|
| | 1 | 1.4 | 2 | 2.8 | 4 | 5.6 | 8 | 11 | 16 | 22 | 32 |
| EV | 0 | 1 | 2 | 3 | 4 | 5 | 6 | 7 | 8 | 9 | 10 | correspondence relationship between the sensitivities and the EV values when the exposure duration is 1 second and the aperture parameter is 1

| sensitivity | | | | | | | | | | |
|---|---|---|---|---|---|---|---|---|---|---|
| | 100 | 200 | 400 | 800 | 1600 | 3200 | 6400 | / | / | / | / |
| EV | 0 | 1 | 2 | 3 | 4 | 5 | 6 | / | / | / | / |

After the photographic technology entered the digital age, the photometry function of the camera has advanced. The EV is often used to indicate a level difference on the exposure scale. Many cameras allow exposure compensation to be set and are usually expressed by EV. In this case, EV refers to the difference between the exposure amount corresponding to the camera photometry data and the actual exposure amount. For example, the exposure compensation of +1 EV refers to increasing the exposure amount corresponding to the camera photometry data by one level, that is, the actual exposure amount is double the exposure amount corresponding to the camera photometry data.

In the embodiment of the present disclosure, when presetting the exposure compensation mode, the EV value corresponding to the determined reference exposure amount may be preset to 0, and the +1 EV refers to that the exposure is added by one level, that is, the exposure amount is double the reference exposure amount. +2 EV means that the exposure is added by two levels, that is, the exposure amount is four times the reference exposure amount. −1 EV means that the exposure is decreased by one level, that is, the exposure amount is 0.5 times the reference exposure amount.

For example, if the number of images to be collected is 7, a range of the EV values corresponding to the preset exposure compensation mode may be [+1, +1, +1, +1, 0, −3, −6]. For the image captured in the exposure compensation mode of +1 EV, the noise problem may be solved by performing a time domain noise reduction with high-brightness image, such that the noise is suppressed while improving the quality of the dark part details. For the image captured in the exposure compensation mode of −6 EV, a problem of overexposure caused by high light luminance may be avoided to maintain highlight details. For the images captured in the exposure compensation mode of 0 EV and −3 EV, a transition between the highlight part and the darkness part may be maintained, such that a good highlight-to-darkness transition effect may be ensured.

It should be noted that the EV values corresponding to the preset exposure compensation mode may be specifically set according to actual needs, or may be calculated based on the set EV value range and the principle that the differences between the respective EV values are equal, which is not limited in embodiments of the present disclosure.

In a possible implementation of the embodiment of the present disclosure, the size of the aperture may be constant, and each images to be collected is collected using a determined reference sensitivity. Therefore, after the number of images to be collected is determined according to the current shake level of the camera module, the exposure duration corresponding to each of the images to be collected may be determined according to the preset exposure compensation mode corresponding to the number of images to be collected currently, and the reference exposure duration. Specifically, if the exposure compensation mode corresponding to the images to be collected is +1 EV, the exposure duration corresponding to the images to be collected is twice the reference duration; if the exposure compensation mode corresponding to the images to be collected is −1 EV, the exposure duration corresponding to the images to be collected is 0.5 times the reference duration, and so on.

For example, according to the current shake level of the camera module, if the number of images to be collected is determined to be 7 and the corresponding EV range corresponding to the preset exposure compensation mode is determined to be [+1, +1, +1, +1., 0, −3, −6], and the reference exposure duration is determined to be 100 milliseconds according to the reference exposure amount and the reference sensitivity, the exposure durations corresponding to respective images to be collected are 200 milliseconds, 200 milliseconds, 200 milliseconds, 200 Milliseconds, 100 milliseconds, 12.5 milliseconds, and 6.25 milliseconds.

Further, there may be various preset exposure compensation modes. In actual use, the exposure compensation mode corresponding to the current situation may be determined according to the real-time condition of the camera module. In other words, in a possible implementation of the embodiment of the present disclosure, before determining the exposure duration corresponding to the images to be collected according to the reference exposure duration and the preset exposure compensation mode, the method further includes: determining the preset exposure compensation mode according to the current shake level of the camera module.

It may be understood that with different current shake levels of the camera module, the determined number of images to be collected may also be different. While with different numbers of images to be collected, different exposure compensation modes are needed. Therefore, in a possible implementation of the embodiment of the present disclosure, the mapping relationship between the shake level of the camera module and the exposure compensation mode may be preset, such that the preset exposure compensation mode corresponding to the number of the images to be collected may be determined according to the current shake level of the camera module.

For example, when the shake level of the imaging device is "no shake", the exposure compensation value EV for each image to be captured ranges from −6 to 2 and a difference between two adjacent EV values is 0.5. When the shake level of the camera module is the "slight shake", the EV value of the corresponding exposure compensation value ranges from −5 to 1, and the difference between two adjacent EV values is 1.

Further, for face shooting and pure scene shooting, different exposure compensation strategies may be adopted to further improve the effect of captured images. In other words, in a possible implementation of the embodiment of the present disclosure, determining the preset exposure compensation mode may further include: detecting whether a face is included in an image currently captured by the camera module; when the face is included in the image currently captured by the camera module, determining the preset exposure compensation mode as a first mode according to the current shake level of the camera module; and when the face is not included in the image currently captured by the camera module, determining the preset exposure compensation mode as a second mode according to the current shake level of the camera module, in which, an exposure compensation range corresponding to the second mode is broader than an exposure compensation range corresponding to the first mode.

In the embodiment of the present disclosure, it may be determined whether the object to be captured includes a human face by the face recognition technology. The face recognition technology is to identify and compare face visual feature information for identity identification. It belongs to biometric recognition technology, which is to distinguish the biological individual based on the biological characteristics of the organism (generally referred to as human). At present, face recognition technology has been applied in many fields, such as digital camera face autofocus and smile shutter technology, enterprise, residential security and management, access control system, and camera monitoring system etc. Commonly used face recognition algorithms include: feature-based recognition algorithms, appearance-based recognition algorithms, and template-based recognition algorithms, and recognition algorithms using neural network, and the like.

It should be noted that, when it is detected that the image currently captured by the camera module includes a human face, the photometry module of the camera module automatically performs metering based on the face region, and determines the reference exposure amount according to the metering result of the face region. However, in the night scene mode, the illuminance for the face region is usually low, resulting in higher determined reference exposure compared to the reference exposure determined when the face is not included. If a lot of overexposed images are collected when a human face is included, the face region may be overexposed, resulting in a poor effect of the target image. Therefore, for the same shake level, the corresponding exposure compensation mode of the image including a human face which is currently captured by the camera module requires a lower exposure compensation range than that when the face is not included.

In a possible implementation of the embodiment of the present disclosure, for the same shake level, different exposure compensation strategies may be adopted according to whether the image currently captured by the camera module includes a human face. Therefore, for the same shake level, it is possible to correspond to several exposure compensation modes. For example, the shake level of the camera module is "slight shake", and the corresponding preset exposure compensation mode has a first mode and a second mode, in which the respective EV values corresponding to the first mode are [0, 0, 0, 0, −2, −4, −6], and the respective EV values corresponding to the second mode are [+1, +1, +1, +1, 0, −3, −6]. After determining the current shake level of the camera module, and according to whether the image currently captured by the camera module includes a human face, a preset exposure compensation mode that matches the current actual situation may be determined.

For example, suppose that the current shake level of the camera module is "slight shake", and the corresponding preset exposure compensation mode includes a first mode and a second mode, in which the respective EV values corresponding to the first mode are [0, 0, 0, 0, −2, −4, −6], and the respective EV values corresponding to the second mode are [+1, +1, +1, +1, 0, −3, −6]. Therefore, the first exposure compensation range of the mode is narrower than the exposure compensation range corresponding to the second mode. If it is detected that the image currently captured by the camera module includes a human face, it is determined that the preset exposure compensation mode is the first mode, that is, the respective EV values are [0, 0, 0, 0, −2, −4, −6]. If it is detected that the image currently captured by the camera module does not include a face, it is determined that the preset exposure compensation mode is the second mode, that is, the respective EV values are [+1, +1, +1, +1, 0, −3, −6].

Further, the performance of the components in the camera module may also affect the exposure compensation mode. In other words, in a possible implementation of the embodiment of the present disclosure, before determining the preset exposure compensation mode, attribute information of respective components in the camera module may also be determined; and further, the preset exposure compensation mode may be determined according to the attribute information of respective components and the current shake level. For example, for different sensors, apertures, shutters, lenses, and different AEC algorithms, there may be differences among the specific EV values corresponding to the exposure compensation mode.

At block 104, images are collected in sequence according to the reference sensitivity and the exposure duration corresponding to each of the images to be collected.

At block 105, a synthesis processing is performed on the collected images to generate a target image.

In embodiments of the present disclosure, after determining the reference sensitivity and the exposure duration corresponding to each image to be collected, the images may be sequentially collected according to the reference sensitivity and the exposure duration, and the collected images are synthesized to generate the target image.

Further, when synthesizing the collected images, different weights may be set for each image to obtain the target image with the best effect. That is, in a possible implementation of the embodiment of the present disclosure, the foregoing act in block 105 may include: performing the synthesis processing on the collected images according to a preset weight corresponding to each of the collected images.

With the imaging processing method for a camera module in a night scene provided by the embodiments of the present disclosure, a current shake level of the camera module is detected in a night scene shooting mode, a number of images to be collected and a reference sensitivity corresponding to each of the images to be collected are determined according to the current shake level of the camera module, and an exposure duration corresponding to each of the images to be collected is determined according to an illuminance of a current shooting scene and the reference sensitivity corresponding to each of the image to be collected. Images are collected in sequence according to the reference sensitivity and the exposure duration corresponding to each of the images to be collected, and a synthesis processing is performed on the collected images to generate a target image. Therefore, by determining the number of images to be collected and the reference sensitivity according to the current shake level of the camera module, and by determining the exposure duration corresponding to each of the images to be collected according to the illuminance of the current shooting scene to synthesize the collected images with different exposure durations, the dynamic range and overall brightness of the captured image in the night scene are improved, and the noise in the image are effectively suppressed, allowing that the ghosting caused by hand-held shaking is suppressed, the quality of captured image in the night scene is improved, and the user experience may be improved as well.

In a possible implementation of the present disclosure, the exposure duration corresponding to the images to be collected may be preset according to the performance of the camera module, and when the exposure duration corresponding to the images to be collected is not within the preset duration, the exposure duration corresponding to the images to be collected can be modified to ensure the image quality while minimizing the shooting time and avoiding the exposure time being too long or too short which will affect the quality of the captured image.

An imaging processing method for a camera module in a night scene according to another embodiment of the present disclosure is further described below with reference to FIG. 2.

Figure 2:
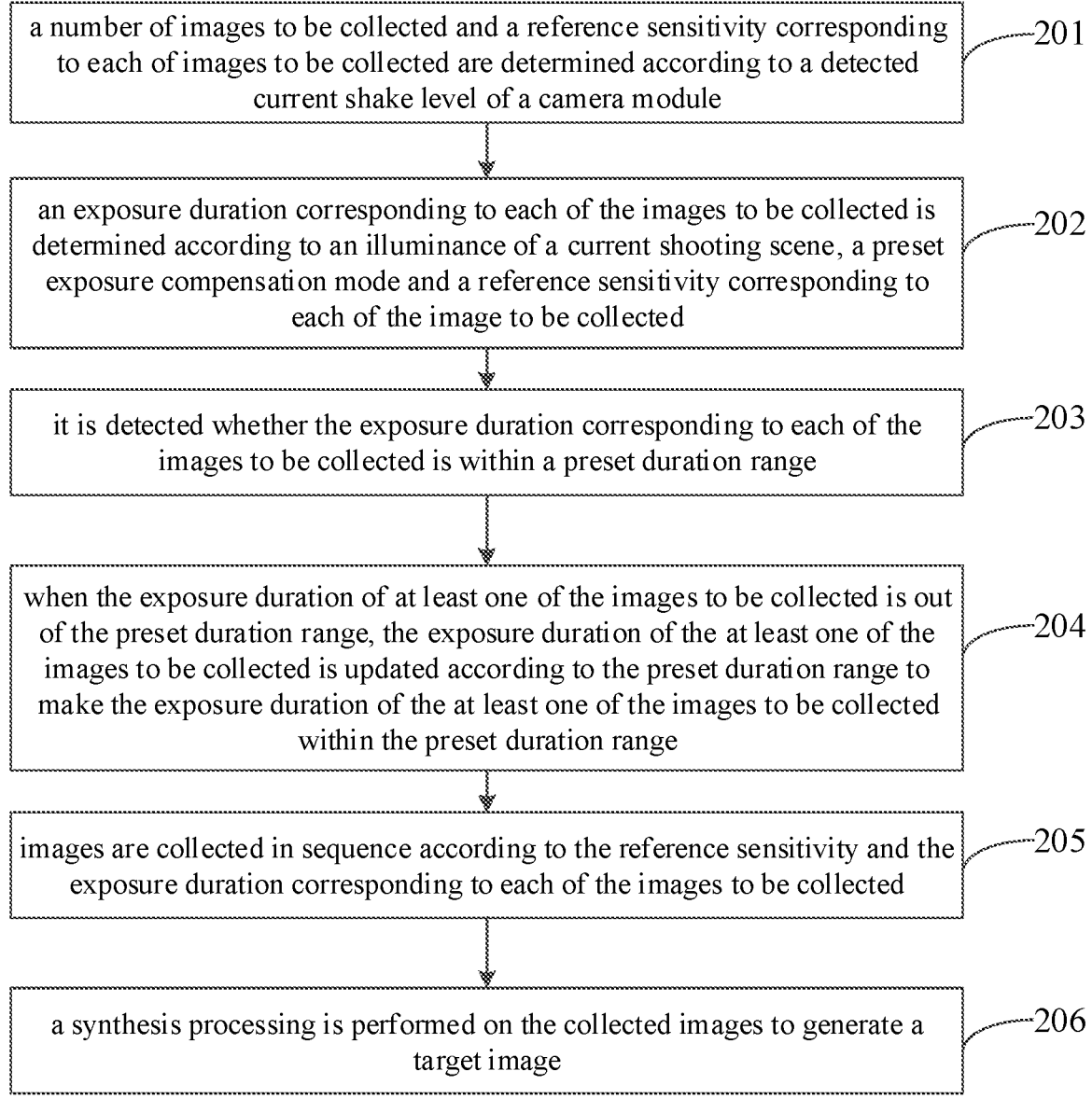
FIG. 2 is a schematic flowchart diagram of an imaging processing method for a camera module in a night scene according to another embodiment of the present disclosure.

FIG. 2 is a schematic flowchart diagram of an imaging processing method for a camera module in a night scene according to another embodiment of the present disclosure.

As illustrated in FIG. 2, the imaging processing method for a camera module in a night scene may include followings.

At block 201, a number of images to be collected and a reference sensitivity corresponding to each of images to be collected are determined according to a detected current shake level of a camera module.

At block 202, an exposure duration corresponding to each of the images to be collected is determined according to an illuminance of a current shooting scene, a preset exposure compensation mode and a reference sensitivity corresponding to each of the image to be collected.

The specific implementation process and the principle of the foregoing acts in blocks 201 to 202 may refer to the detailed description of the foregoing embodiments, which will not be described in detail herein.

At block 203, it is detected whether the exposure duration corresponding to each of the images to be collected is within a preset duration range.

It should be noted that, in order to minimize the shake level during hand-held shooting, when it is detected that the camera module is shaking, the shooting time is shortened as much as possible without affecting the image quality according to the current shake level of the camera module, i.e., the exposure duration of each image is reasonably compressed within a tolerable range.

In the embodiment of the present disclosure, firstly, the reference sensitivity is determined according to the current shake level of the camera module, and then the reference exposure duration is determined according to the illumination of the current shooting scene and the reference sensitivity, and the reference exposure duration is generally within a preset duration range. Then, according to the preset exposure compensation mode and the reference exposure duration, the exposure duration corresponding to each of the images to be collected may be determined. However, since the exposure duration corresponding to each of the images to be collected is calculated according to the preset exposure compensation mode and the reference exposure duration, the exposure duration corresponding to one or more images to be collected may be exceed beyond the preset duration range, resulting in an unsatisfactory result of the acquired image.

For example, if the exposure duration corresponding to a certain image to be collected is greater than the preset maximum duration, not only an image ghost or an image artifact may be included in the image, but also the overall shooting duration may be prolonged. If the exposure duration corresponding to a frame to be collected is smaller than a minimum present duration, the noise in the image may be too large, and no effective imaging information is collected.

It can be understood that, after determining the exposure duration corresponding to each of the images to be collected, the exposure duration corresponding to each of the images to be collected may be compared with the preset duration range to determine whether the exposure duration corresponding each of the images to be collected is within the preset duration range.

Further, the exposure duration range may be preset according to actual conditions, and the threshold that the camera module can tolerate may be related to the arrangement of the optical components in the camera assembly. That is, in a possible implementation of the embodiment of the present disclosure, before the act in block 203, the method may further include: determining the preset duration range according to a manner of setting optical devices in the camera module.

For example, if the optical device in the camera assembly is set to optical image stabilization, the preset duration range may be appropriately expanded, because the camera module capable of implementing the optical image stabilization function can offset a part of the shake, thereby realizing less image ghost and low fuzzy degree in the image collected by the camera module supporting the optical image stabilization function compared with the camera module that cannot realize optical image stabilization under the same shake level. Therefore, compared with the camera module that cannot achieve optical image stabilization, the preset duration range, especially the upper limit of the duration range, can be appropriately expanded to obtain a better quality image.

At block 204, when the exposure duration of at least one of the images to be collected is out of the preset duration range, the exposure duration of the at least one of the images to be collected is updated according to the preset duration range to make the exposure duration of the at least one of the images to be collected within the preset duration range.

In the embodiment of the present disclosure, if the exposure duration of the image to be collected is not within the preset duration range, the exposure duration of the images to be collected may be updated according to the preset duration range, such that the updated exposure duration is within the preset duration range.

For example, assume that the preset duration is 10 milliseconds to 200 milliseconds, the number of images to be collected is determined to be 7 according to the current shake level of the camera module, and the exposure durations of the determined images to be collected are 220 milliseconds, 220 milliseconds, 220 milliseconds, 220 milliseconds, 100 milliseconds, 12.5 milliseconds, and 6.25 milliseconds respectively, then the exposure durations of the first four images to be collected and the $7^{th}$ image to be collected are not within the preset duration range, then exposure durations of the first four images to be collected which are 220 milliseconds may be updated to 200 milliseconds; the exposure duration of the $7^{th}$ image to be collected which is 6.25 milliseconds is updated to 10 milliseconds.

Further, after updating the exposure duration of the image to be collected which is not within the preset duration, the exposure amount may be changed, which may result in the exposure duration of an image to be collected with the updated exposure durations being same or similar to that of another image of which the exposure duration is not updated, i.e., the exposure amount of one image is equal to or approach to that of the other, causing a change of the exposure compensation mode, which may eventually lead to an acquired target image not meeting expectations. Therefore, after updating the exposure duration of the images to be collected, the exposure duration and sensitivity of the other images to be collected may be modified according to the difference between the exposure durations before and after the update. That is, in a possible implementation of the embodiment of the present disclosure, after the act in block 204, the method may further include: determining, according to a difference between the exposure duration before the updating and the exposure duration after the updating, an exposure amount adjustment mode corresponding to each of the images to be collected; and adjusting a sensitivity and the exposure duration of each of the images to be collected according to the exposure amount adjustment mode.

It can be understood that, in a possible implementation of the embodiment of the present disclosure, a fourth threshold of the exposure duration difference may also be preset, and if the difference between the exposure durations before and after updating the images to be collected is greater than the fourth threshold, an exposure amount adjustment mode corresponding to each image to be collected is determined as "adjustment", and according to the difference between the exposure durations before and after updating the image to be collected, the exposure durations of other images are correspondingly modified, such that the difference between the exposure durations of the image to be collected before the updating is the same as that after the updating; if the difference between the exposure durations before and after the updating the image to be collected is smaller than the fourth threshold, the difference between the exposure durations of the images to be collected before and after the update may be considered as small and could be ignored, and therefore the exposure amount adjustment mode corresponding to each image to be collected is determined as "no adjustment".

It should be noted that, after updating the exposure duration of each image to be acquired according to the difference between the exposure duration before and after updating the images to be collected, it is likely to cause some exposure durations after the images to be collected is updated are not within the preset duration range. Therefore, the exposure duration and sensitivity of the images to be collected can be adjusted at the same time, such that the exposure duration after the images to be collected is updated to be within the preset duration range.

For example, assume that the preset duration ranges from 10 milliseconds to 200 milliseconds, and the fourth threshold is 20 milliseconds. According to the current shake level of the camera module, it is determined that the number of images to be collected is 7, the reference sensitivity is 100, and the exposure durations of the images to be collected before the updating are 230 milliseconds, 230 milliseconds, 230 milliseconds, 230 milliseconds, 150 seconds, 50 milliseconds, and 12.5 milliseconds. Therefore, the exposure durations of the first four images to be collected which are 230 milliseconds are not within the preset duration range, the exposure durations of the images to be collected which are 230 milliseconds may be updated to 200 milliseconds, that is, the exposure duration after updating the images to be collected is 200 milliseconds, 200 milliseconds, 200 milliseconds, 200 milliseconds, 150 milliseconds, 50 milliseconds, and 12.5 milliseconds, respectively. Therefore, the difference between the exposure durations of the four image to be collected before and after the updating is 30 milliseconds, which is greater than 20 milliseconds, such that the exposure duration and sensitivity of each image may be adjusted to in order to ensure the change trend of the exposure amount between the images of each frame, such that the exposure adjustment mode is determined as "adjustment". For example, the sensitivity of the first four images to be collected are adjusted to (100×230)/200=115, and the exposure duration of the fifth image is adjusted to (100×150)/115=3000/23 milliseconds, and the exposure duration of the sixth image is adjusted to (100×50)/115=1000/23 milliseconds, and the exposure time of the seventh image is adjusted to (100×12.5)/115=250/23 milliseconds.

It should be noted that the above examples are merely exemplary and are not to be considered as limitations. In actual use, the fourth threshold may be preset according to actual needs, which is not limited herein.

At block 205, images are collected in sequence according to the reference sensitivity and the exposure duration corresponding to each of the images to be collected.

At block 206, a synthesis processing is performed on the collected images to generate a target image.

The specific implementation process and the principle of the foregoing acts in blocks 205 to 206 may refer to the detailed description of the foregoing embodiments, which will not be described herein.

With the imaging processing method for a camera module in a night scene provided by the embodiment of the present disclosure, a number of images to be collected and a reference sensitivity corresponding to each of images to be collected are determined according to a detected current shake level of a camera module, and an exposure duration corresponding to each of the images to be collected is determined according to an illuminance of a current shooting scene, a preset exposure compensation mode and a reference sensitivity corresponding to each of the image to be collected. After that, it is detected whether the exposure duration corresponding to each of the images to be collected is within a preset duration range, the exposure duration of the images to be collected of which the exposure duration is not within a preset duration range is updated. Images are collected in sequence according to the reference sensitivity and the updated exposure duration corresponding to each of the images to be collected, and a synthesis processing is performed on the collected images to generate a target image. Therefore, the number of images to be collected and the reference sensitivity are determined according to the current shake level of the camera module, and the exposure duration corresponding to each images to be collected is determined according to the illumination degree of the current shooting scene and the preset exposure compensation mode. The exposure duration corresponding to the images to be collected in which the exposure duration exceeds the preset duration range may be adjusted according to the preset duration range, such that not only the exposure duration corresponding to each images to be collected is within a preset range, but also ensures that each exposure period is guaranteed. The images to be collected are collected according to the preset exposure compensation mode, which further improves the quality of the night shot image and improves the user experience.

In order to implement the above embodiments, the present disclosure further provides imaging processing apparatus for a camera module in a night scene.

Figure 3:
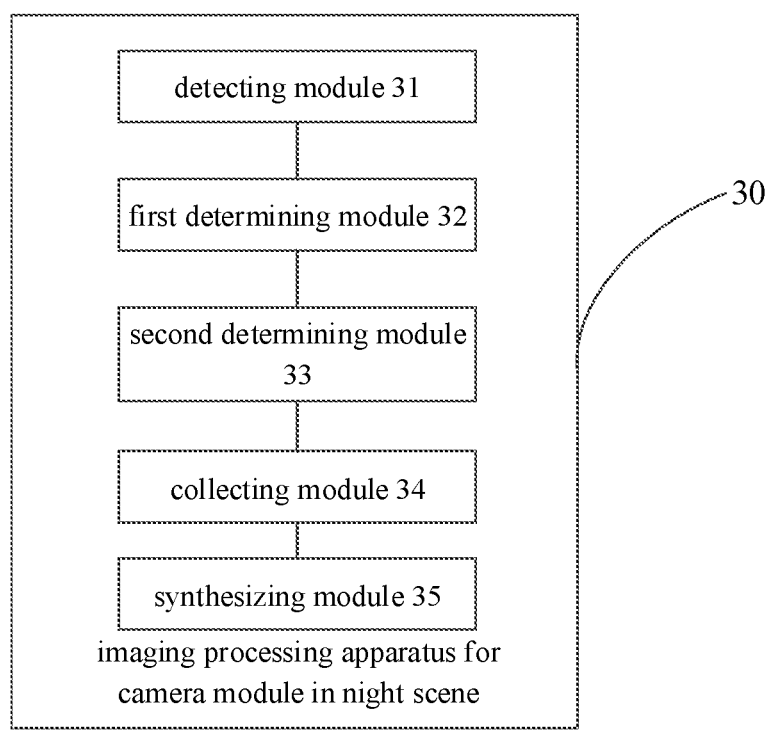
FIG. 3 is a schematic structural diagram of an imaging processing apparatus for a camera module in a night scene according to an embodiment of the present disclosure.

FIG. 3 is a schematic structural diagram of an imaging processing apparatus for a camera module in a night scene according to an embodiment of the present disclosure.

As illustrated in FIG. 3, the imaging processing apparatus 30 for a camera module in a night scene includes: a detecting module, a first determining module, a second determining module, a collecting module and a synthesizing module.

The detecting module is configured to detect a current shake level of the camera module in a night scene shooting mode.

The first determining module is configured to determine a number of images to be collected and a reference sensitivity corresponding to each of the images to be collected according to the current shake level of the camera module.

The second determining module is configured to determine an exposure duration corresponding to each of the images to be collected according to an illuminance of a current shooting scene and the reference sensitivity corresponding to each of the image to be collected.

The collecting module is configured to collect images in sequence according to the reference sensitivity and the exposure duration corresponding to each of the images to be collected.

The synthesizing module is configured to perform a synthesis processing on the collected images to generate a target image.

In actual use, the imaging processing apparatus for a camera module in a night scene provided by embodiments of the present disclosure may be configured in any electronic device to execute the imaging processing method for a camera module in a night scene described above.

With the imaging processing apparatus for a camera module in a night scene provided by the embodiments of the present disclosure, a current shake level of the camera module is detected in a night scene shooting mode, a number of images to be collected and a reference sensitivity corresponding to each of the images to be collected are determined according to the current shake level of the camera module, and an exposure duration corresponding to each of the images to be collected is determined according to an illuminance of a current shooting scene and the reference sensitivity corresponding to each of the image to be collected. Images are collected in sequence according to the reference sensitivity and the exposure duration corresponding to each of the images to be collected, and a synthesis processing is performed on the collected images to generate a target image. Therefore, by determining the number of images to be collected and the reference sensitivity according to the current shake level of the camera module, and by determining the exposure duration corresponding to each of the images to be collected according to the illuminance of the current shooting scene to synthesize the collected images with different exposure durations, the dynamic range and overall brightness of the captured image in the night scene are improved, and the noise in the image are effectively suppressed, allowing that the ghosting caused by hand-held shaking is suppressed, the quality of captured image in the night scene is improved, and the user experience may be improved as well.

In a possible implementation of the present disclosure, the apparatus 30 is specifically configured to: determine the preset duration range according to a manner of setting optical devices in the camera module.

In a possible implementation of the present disclosure, the apparatus 30 is specifically configured to: detect whether the exposure duration corresponding to each of the images to be collected is within a preset duration range; and when the exposure duration of at least one of the images to be collected is out of the preset duration range, update the exposure duration of the at least one of the images to be collected according to the preset duration range to make the exposure duration of the at least one of the images to be collected within the preset duration range.

In a possible implementation of the present disclosure, the foregoing second determining module 33 is specifically configured to: determine a reference exposure amount according to the illuminance of the current shooting scene; determine a reference exposure duration according to the reference exposure amount and the reference sensitivity corresponding to each of the images to be collected; and determine, according to the reference exposure duration and a preset exposure compensation mode, the exposure duration corresponding to each of the images to be collected.

Further, in another possible implementation of the present disclosure, the foregoing second determining module 33 is further configured to: determine the preset exposure compensation mode according to the current shake level of the camera module.

Further, in a further possible implementation of the disclosure, the second determining module 33 is further configured to: detect whether a face is included in an image currently captured by the camera module; when the face is included in the image currently captured by the camera module, determine the preset exposure compensation mode as a first mode according to the current shake level of the camera module; when the face is not included in the image currently captured by the camera module, determine the preset exposure compensation mode as a second mode according to the current shake level of the camera module, in which, an exposure compensation range corresponding to the second mode is broader than an exposure compensation range corresponding to the first mode.

Further, in a further possible implementation of the present disclosure, the foregoing second determining module 33 is further configured to: determine attribute information of respective components in the camera module; determine the preset exposure compensation mode according to the attribute information of respective components and the current shake level.

In a possible implementation of the present disclosure, the foregoing synthesizing module 35 is specifically configured to: perform the synthesis processing on the collected images according to a preset weight corresponding to each of the collected images.

It should be noted that the explanation of the embodiments of the imaging processing apparatus for a camera module in a night scene illustrated in FIG. 1 and FIG. 2 is also applicable to the imaging processing apparatus 30 for a camera module in a night scene of this embodiment, and details are not described herein again.

With the imaging processing apparatus for a camera module in a night scene provided by the embodiment of the present disclosure, a number of images to be collected and a reference sensitivity corresponding to each of images to be collected are determined according to a detected current shake level of a camera module, and an exposure duration corresponding to each of the images to be collected is determined according to an illuminance of a current shooting scene, a preset exposure compensation mode and a reference sensitivity corresponding to each of the image to be collected. After that, it is detected whether the exposure duration corresponding to each of the images to be collected is within a preset duration range, the exposure duration of the images to be collected of which the exposure duration is not within a preset duration range is updated. Images are collected in sequence according to the reference sensitivity and the updated exposure duration corresponding to each of the images to be collected, and a synthesis processing is performed on the collected images to generate a target image. Therefore, the number of images to be collected and the reference sensitivity are determined according to the current shake level of the camera module, and the exposure duration corresponding to each images to be collected is determined according to the illumination degree of the current shooting scene and the preset exposure compensation mode. The exposure duration corresponding to the images to be collected in which the exposure duration exceeds the preset duration range may be adjusted according to the preset duration range, such that not only the exposure duration corresponding to each images to be collected is within a preset range, but also ensures that each exposure period is guaranteed. The images to be collected are collected according to the preset exposure compensation mode, which further improves the quality of the night shot image and improves the user experience.

In order to implement the above embodiments, the present disclosure also proposes an electronic device.

Figure 4:
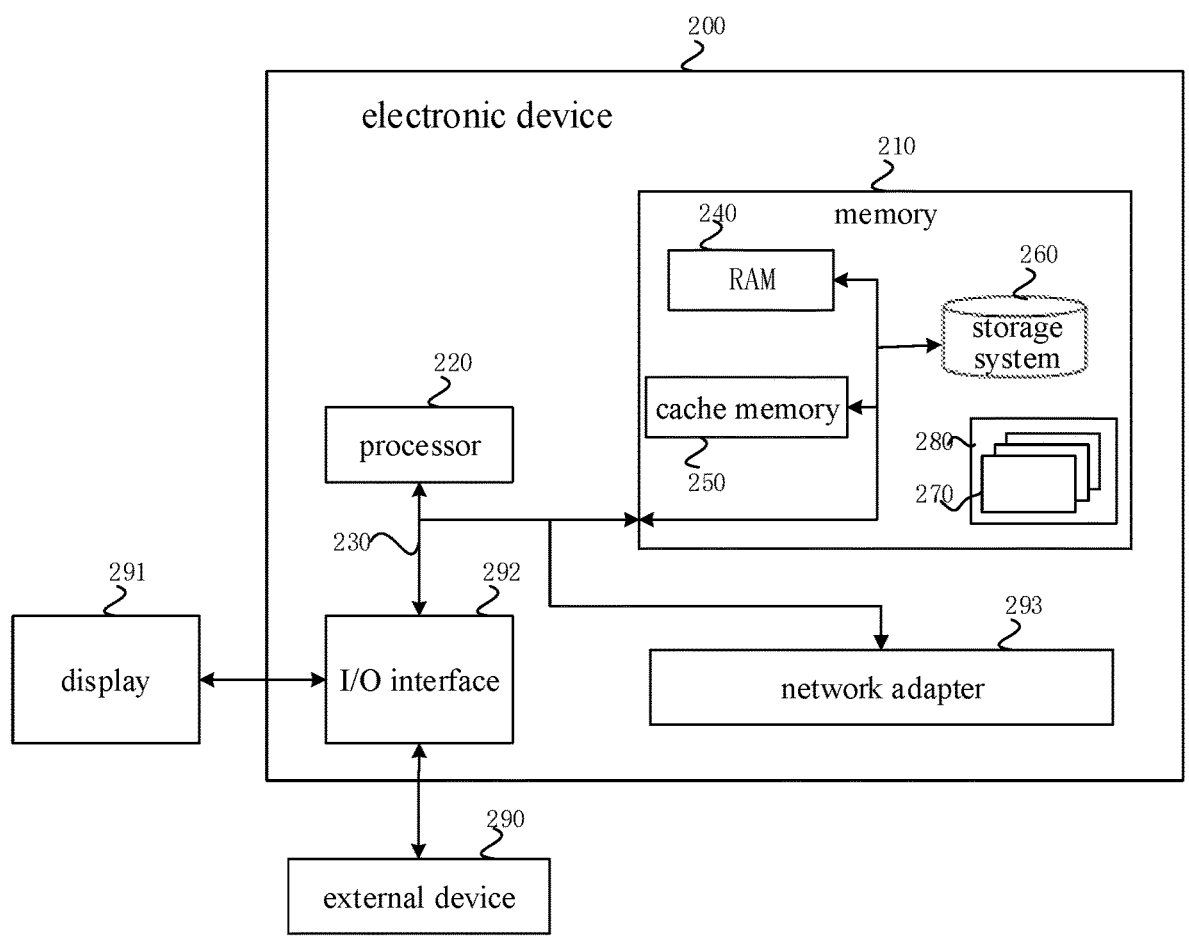
FIG. 4 is a schematic structural diagram of an electronic device according to an embodiment of the present disclosure.

FIG. 4 is a schematic structural diagram of an electronic device according to an embodiment of the present disclosure.

As illustrated in FIG. 4, the electronic device 200 includes: a memory 210 and a processor 220, a bus 230 connecting different components (including the memory 210 and the processor 220). The memory 210 stores a computer program. When the processor 220 executes the program, the imaging processing method for a camera module in a night scene is achieved.

The bus 230 represents one or more of several types of bus structures, including a memory bus or memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an Enhanced ISA Bus, a Video Electronics Standards Association (VESA) local bus, and peripheral component interconnects (PCI) bus.

The electronic device 200 typically includes a variety of electronic device readable mediums. These mediums can be any available medium that can be accessed by the electronic device 200, including volatile and non-volatile media, removable and non-removable media.

The memory 210 may also include computer system readable medium in the form of volatile memory, such as random access memory (RAM) 240 and/or cache memory 250. Electronic device 200 may further include other removable/non-removable, volatile/non-volatile computer system storage mediums. By way of example only, storage system 260 may be used to read and write non-removable, non-volatile magnetic media (not illustrated in FIG. 4, commonly referred to as a "hard disk drive"). Although not illustrated in FIG. 4, a disk drive for reading and writing to a removable non-volatile disk (such as a "floppy disk"), and an optical drive for reading and writing to a removable non-volatile disk (such as a CD-ROM, DVD-ROM or other optical mediums) may be provided. In these cases, each drive can be coupled to bus 230 via one or more data medium interfaces. The memory 210 can include at least one program product having a set (e.g., at least one) of program modules configured to perform the functions of the various embodiments of the present disclosure.

A program/utility 280 having a set (at least one) of program modules 270, which may be stored, for example, in the memory 210, such program modules 270 include, but are not limited to, an operating system, one or more programs, other program modules and program data, each of these examples or some combination may include an implementation of a network environment. The program module 270 typically performs the functions and/or methods of the embodiments described herein.

The electronic device 200 can also be in communication with one or more external devices 290 (e.g., a keyboard, a pointing device, a display 291, etc.), and can also be in communication with one or more devices that enable a user to interact with the electronic device 200, and/or any devices (e.g., a network card, a modem, etc.) that enables the electronic device 200 to communicate with one or more other computing devices. This communication can take place via an input/output (I/O) interface 292. Also, the electronic device 200 can communicate with one or more networks (e.g., a local area network (LAN), a wide area network (WAN), and/or a public network, such as the Internet) through the network adapter 293. As illustrated in the figures, the network adapter 293 communicates with other modules of electronic device 200 via bus 230. It should be understood that although not illustrated in the figures, other hardware and/or software modules may be utilized in conjunction with electronic device 200, including but not limited to: microcode, device drivers, redundant processing units, external disk drive arrays, RAID systems, tape drives, and data backup storage systems, etc.

The processor 220 executes various functional application and data processing by running a program stored in the memory 210.

It should be noted that the implementation process and technical principles of the electronic device in this embodiment are described in the foregoing description of the imaging processing apparatus for a camera module in a night scene in the embodiment of the present disclosure, and details are not described herein again.

The electronic device provided by the embodiment of the present disclosure may perform the imaging processing apparatus for a camera module in a night scene as described above, in which a current shake level of the camera module is detected in a night scene shooting mode, a number of images to be collected and a reference sensitivity corresponding to each of the images to be collected are determined according to the current shake level of the camera module, and an exposure duration corresponding to each of the images to be collected is determined according to an illuminance of a current shooting scene and the reference sensitivity corresponding to each of the image to be collected. Images are collected in sequence according to the reference sensitivity and the exposure duration corresponding to each of the images to be collected, and a synthesis processing is performed on the collected images to generate a target image. Therefore, by determining the number of images to be collected and the reference sensitivity according to the current shake level of the camera module, and by determining the exposure duration corresponding to each of the images to be collected according to the illuminance of the current shooting scene to synthesize the collected images with different exposure durations, the dynamic range and overall brightness of the captured image in the night scene are improved, and the noise in the image are effectively suppressed, allowing that the ghosting caused by hand-held shaking is suppressed, the quality of captured image in the night scene is improved, and the user experience may be improved as well.

The computer readable storage medium has a computer program stored thereon, and the program is executed by the processor to implement the imaging processing method for a camera module in a night scene according to the embodiment of the present disclosure.

In order to implement the above embodiments, a further embodiment of the present disclosure provides a computer program, which is executed by the processor to implement the imaging processing method for a camera module in a night scene according to the embodiment of the present disclosure.

In an alternative implementation, this embodiment can employ any combination of one or more computer readable medium. The computer readable medium can be a computer readable signal medium or a computer readable storage medium. The computer readable storage medium can be, for example, but not limited to, an electronic, magnetic, optical, electromagnetic, infrared, or semiconductor system, apparatus, or device, or any combination of the above. More specific examples (non-exhaustive lists) of computer readable storage medium include: electrical connections having one or more wires, a portable computer disk, a hard disk, a random access memory (RAM), a read only memory (ROM), erasable programmable read only memory (EPROM or flash memory), optical fiber, portable compact disk read only memory (CD-ROM), optical storage device, magnetic storage device, or any suitable combination of the foregoing. In this document, a computer readable storage medium can be any tangible medium that can contain or store a program, which can be used by or in connection with an instruction execution system, apparatus or device.

A computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device.

The program code embodied on a computer readable medium can be transmitted by any suitable medium, including but not limited to wireless, wire, fiber optic cable, RF, etc., or any suitable combination of the foregoing.

Computer program code for performing the operations of the present invention may be written in one or more programming languages, or a combination thereof, including an object oriented programming language such as Java, Smalltalk, C++, and conventional Procedural programming language—such as the "C" language or a similar programming language. The program code may be executed entirely on the user's electronic device, partly on the user's electronic device, as a stand-alone software package, partly on the user's electronic device, partly on the remote electronic device, or entirely on the remote electronic device or Executed on the server. In the case of a remote electronic device, the remote electronic device can be connected to the user electronic device through any kind of network, including a local area network (LAN) or a wide area network (WAN), or can be connected to an external electronic device (e.g., using an Internet service) The provider is connected via the Internet).

Other embodiments of the present disclosure will be readily apparent to those skilled in the art. The present disclosure is intended to cover any variations, uses, or adaptations of the present disclosure, which are in accordance with the general principles of the disclosure and include common general knowledge or conventional technical means in the art that are not invented by the present disclosure. The specification and examples are to be regarded as illustrative only, and the real scope and spirit of the present disclosure are specified by the claims.

It is to be understood that the present disclosure is not limited to the description mentioned above and the details illustrated in the figures, which could be modified and changed in various manners within the scope of the present disclosure. The scope of the present disclosure is limited only by the accompanying claims.

What is claimed is:

1. A method of imaging processing for a camera module in a night scene, comprising:
   detecting a current shake level of the camera module in a night scene shooting mode;
   determining, according to the current shake level of the camera module, a number of images to be collected and a reference sensitivity corresponding to each of the images to be collected, wherein the number of images to be collected is inversely proportional to a shake level of the camera module, and different shake levels correspond to different numbers of images to be collected;
   determining an exposure duration corresponding to each of the images to be collected according to an illuminance of a current shooting scene and the reference sensitivity corresponding to each of the image to be collected;

collecting images in sequence according to the reference sensitivity and the exposure duration corresponding to each of the images to be collected; and performing a synthesis processing on the collected images to generate a target image.

2. The method of claim 1, further comprising:

detecting whether the exposure duration corresponding to each of the images to be collected is within a preset duration range; and when the exposure duration of at least one of the images to be collected is out of the preset duration range, updating the exposure duration of the at least one of the images to be collected according to the preset duration range to make the exposure duration of the at least one of the images to be collected within the preset duration range.

3. The method of claim 2, further comprising:

determining the preset duration range according to a manner of setting optical devices in the camera module.

4. The method of claim 2, further comprising:

determining, according to a difference between the exposure duration before the updating and the exposure duration after the updating, an exposure amount adjustment mode corresponding to each of the images to be collected; and adjusting a sensitivity and the exposure duration of each of the images to be collected according to the exposure amount adjustment mode.

5. The method of claim 1, wherein determining the exposure duration corresponding to each of the images to be collected according to the illuminance of the current shooting scene and the reference sensitivity corresponding to each of the image to be collected comprises:

determining a reference exposure amount according to the illuminance of the current shooting scene;

determining a reference exposure duration according to the reference exposure amount and the reference sensitivity corresponding to each of the images to be collected; and determining, according to the reference exposure duration and a preset exposure compensation mode, the exposure duration corresponding to each of the images to be collected.

6. The method of claim 5, further comprising:

determining the preset exposure compensation mode according to the current shake level of the camera module.

7. The method of claim 6, wherein determining the preset exposure compensation mode comprises:

detecting whether a face is included in an image currently captured by the camera module;

when the face is included in the image currently captured by the camera module, determining the preset exposure compensation mode as a first mode according to the current shake level of the camera module; and when the face is not included in the image currently captured by the camera module, determining the preset exposure compensation mode as a second mode according to the current shake level of the camera module, in which, an exposure compensation range corresponding to the second mode is broader than an exposure compensation range corresponding to the first mode.

8. The method of claim 6, further comprising:

determining attribute information of respective components in the camera module; and determining the preset exposure compensation mode comprises:

determining the preset exposure compensation mode according to the attribute information of respective components and the current shake level.

9. The method of claim 1, wherein performing the synthesis processing on the collected images to generate the target image comprises:

performing the synthesis processing on the collected images according to a preset weight corresponding to each of the collected images.

10. The method of claim 1, wherein detecting a current shake level of the camera module in a night scene shooting mode comprises: detecting a current shake level of the camera module by acquiring current Gyro-sensor information of an electronic device comprising the camera module.

11. An electronic device, comprising a camera module, a memory, a processor, and a computer program stored on the memory and operable on the processor, wherein when the processor executes the computer program, the processor is configured to:

detect a current shake level of the camera module in a night scene shooting mode;

determine, according to the current shake level of the camera module, a number of images to be collected and a reference sensitivity corresponding to each of the images to be collected, wherein the number of images to be collected is inversely proportional to a shake level of the camera module, and different shake levels correspond to different numbers of images to be collected;

determine an exposure duration corresponding to each of the images to be collected according to an illuminance of a current shooting scene and the reference sensitivity corresponding to each of the image to be collected;

collect images in sequence according to the reference sensitivity and the exposure duration corresponding to each of the images to be collected; and perform a synthesis processing on the collected images to generate a target image.

12. The electronic device of claim 11, wherein the processor is further configured to:

detect whether the exposure duration corresponding to each of the images to be collected is within a preset duration range; and when the exposure duration of at least one of the images to be collected is out of the preset duration range, update the exposure duration of the at least one of the images to be collected according to the preset duration range to make the exposure duration of the at least one of the images to be collected within the preset duration range.

13. The electronic device of claim 12, wherein the processor is further configured to:

determine the preset duration range according to a manner of setting optical devices in the camera module.

14. The electronic device of claim 12, wherein the processor is further configured to:

determine, according to a difference between the exposure duration before the updating and the exposure duration after the updating, an exposure amount adjustment mode corresponding to each of the images to be collected; and adjust a sensitivity and the exposure duration of each of the images to be collected according to the exposure amount adjustment mode.

15. The electronic device of claim 11, wherein the processor determines the exposure duration corresponding to each of the images to be collected according to the illuminance of the current shooting scene and the reference sensitivity corresponding to each of the image to be collected by performing acts of:
- determining a reference exposure amount according to the illuminance of the current shooting scene;
- determining a reference exposure duration according to the reference exposure amount and the reference sensitivity corresponding to each of the images to be collected; and
- determining, according to the reference exposure duration and a preset exposure compensation mode, the exposure duration corresponding to each of the images to be collected.

16. The electronic device of claim 15, wherein the processor is further configured to:
- determine the preset exposure compensation mode according to the current shake level of the camera module.

17. The electronic device of claim 16, wherein the processor determines the preset exposure compensation mode by performing acts of:
- detecting whether a face is included in an image currently captured by the camera module;
- when the face is included in the image currently captured by the camera module, determining the preset exposure compensation mode as a first mode according to the current shake level of the camera module; and
- when the face is not included in the image currently captured by the camera module, determining the preset exposure compensation mode as a second mode according to the current shake level of the camera module, in which, an exposure compensation range corresponding to the second mode is broader than an exposure compensation range corresponding to the first mode.

18. The electronic device of claim 16, wherein the processor is further configured to:
- determine attribute information of respective components in the camera module; and
- the processor determines the preset exposure compensation mode by performing an act of:
- determining the preset exposure compensation mode according to the attribute information of respective components and the current shake level.

19. The electronic device of claim 11, wherein the processor performs the synthesis processing on the collected images to generate the target image by performing an act of:
- performing the synthesis processing on the collected images according to a preset weight corresponding to each of the collected images.

20. A non-transitory computer readable storage medium having stored thereon a computer program, wherein the computer program is executed by a processor to implement a method of imaging processing for a camera module in a night scene, and the method comprises:
- detecting a current shake level of the camera module in a night scene shooting mode;
- determining, according to the current shake level of the camera module, a number of images to be collected and a reference sensitivity corresponding to each of the images to be collected, wherein the number of images to be collected is inversely proportional to a shake level of the camera module, and different shake levels correspond to different numbers of images to be collected;
- determining an exposure duration corresponding to each of the images to be collected according to an illuminance of a current shooting scene and the reference sensitivity corresponding to each of the image to be collected;
- collecting images in sequence according to the reference sensitivity and the exposure duration corresponding to each of the images to be collected; and
- performing a synthesis processing on the collected images to generate a target image.

* * * * *